(12) United States Patent
Gupta et al.

(10) Patent No.: US 8,371,710 B2
(45) Date of Patent: Feb. 12, 2013

(54) FOCUSING LENS SYSTEM

(75) Inventors: Anurag Gupta, Los Gatos, CA (US);
Gregory David Windom, Portland, OR (US); Owen W. Dukelow, Portland, OR (US)

(73) Assignee: Coast Cutlery Company, Portland, OR (US)

( * ) Notice: Subject to any disclaimer, the term of this patent is extended or adjusted under 35 U.S.C. 154(b) by 265 days.

(21) Appl. No.: 12/960,434

(22) Filed: Dec. 3, 2010

(65) Prior Publication Data

US 2011/0080736 A1    Apr. 7, 2011

Related U.S. Application Data

(63) Continuation-in-part of application No. 12/572,910, filed on Oct. 2, 2009, now Pat. No. 8,152,327.

(51) Int. Cl.
*F21L 4/00* (2006.01)
(52) U.S. Cl. .......... 362/188; 362/326; 362/187
(58) Field of Classification Search ............ 362/187, 362/326, 800; 359/387, 392
See application file for complete search history.

(56) References Cited

U.S. PATENT DOCUMENTS

| | | | |
|---|---|---|---|
| 1,478,282 A | 12/1923 | Hunter |
| 1,507,212 A | 9/1924 | Silberstein |
| 1,524,205 A | 1/1925 | Papke |
| 1,603,272 A | 10/1926 | Eaton |
| 2,165,531 A | 7/1939 | Bertrand |
| 2,215,900 A | 9/1940 | Bitner |
| 2,254,961 A | 7/1941 | Harris |
| 2,254,962 A | 9/1941 | Harris et al. |
| 2,356,654 A | 8/1944 | Cullman |
| 3,547,423 A | 12/1970 | Jenny et al. |
| 3,890,497 A | 6/1975 | Rush |
| 4,255,746 A | 3/1981 | Johnson et al. |
| 4,638,343 A | 1/1987 | Althaus et al. |
| 4,698,730 A | 10/1987 | Sakai et al. |
| 4,767,172 A | 8/1988 | Nichols et al. |
| 4,770,514 A | 9/1988 | Silverglate |
| 4,965,488 A | 10/1990 | Hihi |
| 5,143,442 A | 9/1992 | Ishikawa et al. |

(Continued)

FOREIGN PATENT DOCUMENTS

| | | |
|---|---|---|
| CA | 2399348 | 3/2003 |
| DE | 19624087 | 12/1997 |

(Continued)

OTHER PUBLICATIONS

International Search Report mailed May 4, 2012 from International Application No. PCT/US2011/063293.

(Continued)

*Primary Examiner* — Ali Alavi
(74) *Attorney, Agent, or Firm* — Schwabe, Williamson & Wyatt, P.C.

(57) ABSTRACT

A lens for a flashlight or other lighting unit provides for focusing light from a source, such as an LED, to provide a light beam adjustable between a spot beam and a wide beam. The lens includes a lens body with a front face, a rear LED-receiving well, and a side surface extending between the front face and the rear well. The front face includes a central surface surrounded by an annular concave surface. The rear well includes a space for the LED to be adjusted in position. The rear well space is defined by a concavely-curved sidewall and a concavely-curved base. The concave curvature of the sidewall and base may be Bezier curves.

20 Claims, 7 Drawing Sheets

U.S. PATENT DOCUMENTS

| | | |
|---|---|---|
| 5,555,161 A | 9/1996 | Roe et al. |
| 5,757,557 A | 5/1998 | Medvedev et al. |
| 5,831,777 A | 11/1998 | Iwasa |
| 5,894,195 A | 4/1999 | McDermott |
| 6,033,087 A | 3/2000 | Shozo et al. |
| 6,166,860 A | 12/2000 | Medvedev |
| 6,177,761 B1 | 1/2001 | Pelka et al. |
| 6,296,376 B1 | 10/2001 | Kondo et al. |
| 6,350,041 B1 | 2/2002 | Tarsa et al. |
| 6,478,453 B2 | 11/2002 | Lammers et al. |
| 6,488,392 B1 | 12/2002 | Lu |
| 6,536,923 B1 | 3/2003 | Merz |
| 6,547,423 B2 | 4/2003 | Marshall et al. |
| 6,560,038 B1 | 5/2003 | Parkyn, Jr. et al. |
| 6,637,921 B2 | 10/2003 | Coushaine |
| 6,648,490 B2 | 11/2003 | Klose |
| 6,724,543 B1 | 4/2004 | Chinniah et al. |
| 6,841,804 B1 | 1/2005 | Chen et al. |
| 6,851,835 B2 | 2/2005 | Smith et al. |
| 6,955,451 B2 | 10/2005 | Coushaine et al. |
| 6,957,897 B1 | 10/2005 | Nelson et al. |
| 7,021,797 B2 | 4/2006 | Minano et al. |
| 7,083,297 B2 * | 8/2006 | Matthews et al. ............ 362/184 |
| 7,083,299 B2 | 8/2006 | Chapman |
| 7,152,995 B2 | 12/2006 | Chapman |
| 7,241,033 B2 | 7/2007 | Opolka |
| 7,401,948 B2 | 7/2008 | Chinniah et al. |
| 8,152,327 B2 * | 4/2012 | Brands et al. ................ 362/187 |
| 2003/0063474 A1 | 4/2003 | Coushaine |
| 2003/0189826 A1 | 10/2003 | Yoon |
| 2004/0130892 A1 | 7/2004 | Galli |
| 2004/0228131 A1 | 11/2004 | Minano et al. |
| 2005/0157492 A1 * | 7/2005 | Chiu ............................ 362/184 |
| 2005/0162845 A1 | 7/2005 | McDermott |
| 2005/0254233 A1 * | 11/2005 | Alessio ........................ 362/169 |
| 2006/0002114 A1 | 1/2006 | Sun |
| 2006/0012997 A1 | 1/2006 | Catalano et al. |
| 2007/0263390 A1 | 11/2007 | Timinger et al. |
| 2009/0225552 A1 | 9/2009 | Chen |
| 2010/0264821 A1 | 10/2010 | Lutz et al. |

FOREIGN PATENT DOCUMENTS

| | | |
|---|---|---|
| DE | 20307739 U1 | 10/2003 |
| DE | 202005007500 U1 | 7/2005 |
| EP | 236113 | 3/1987 |
| EP | 1298382 | 4/2003 |
| JP | 10-172328 A | 6/1998 |
| KR | 10-2006-0071033 A | 6/2006 |
| KR | 10-0837573 B1 | 6/2008 |
| WO | 0051403 | 8/2000 |
| WO | 2009055766 A2 | 4/2009 |

OTHER PUBLICATIONS

Notice of Allowance issued Dec. 2, 2011 from U.S. Appl. No. 12/572,910.

* cited by examiner

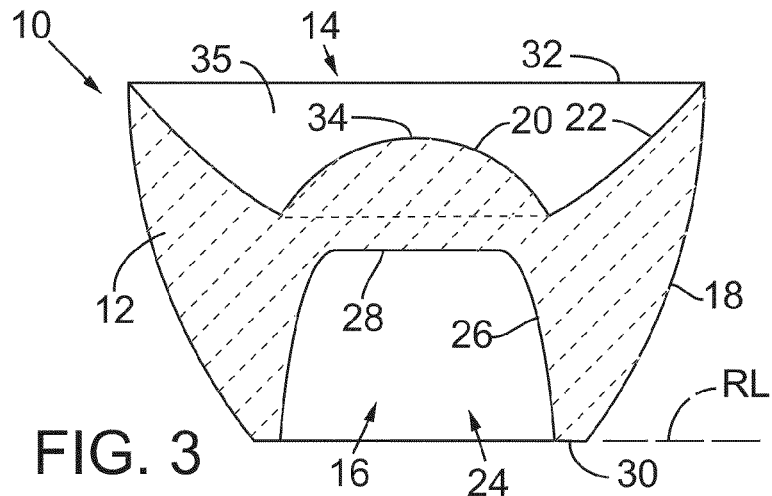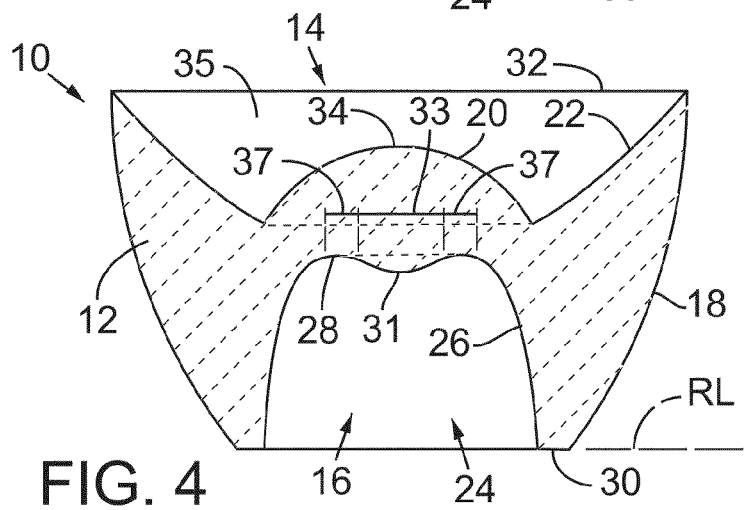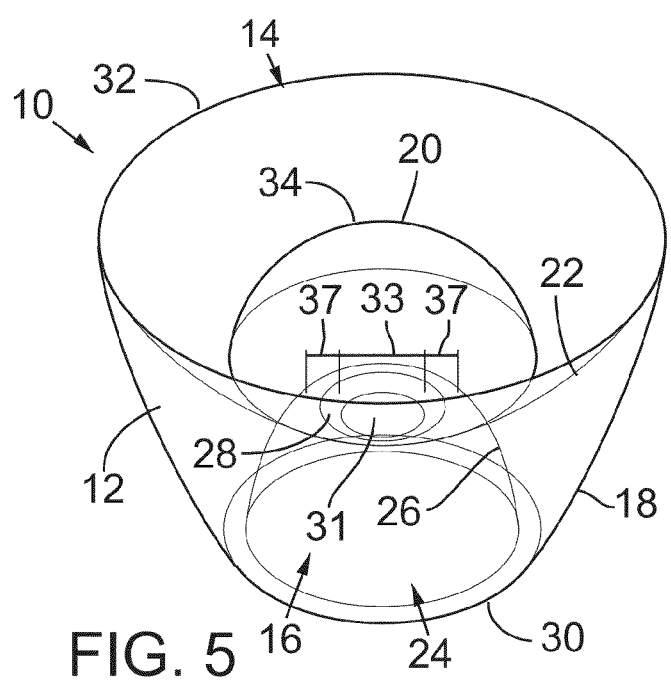

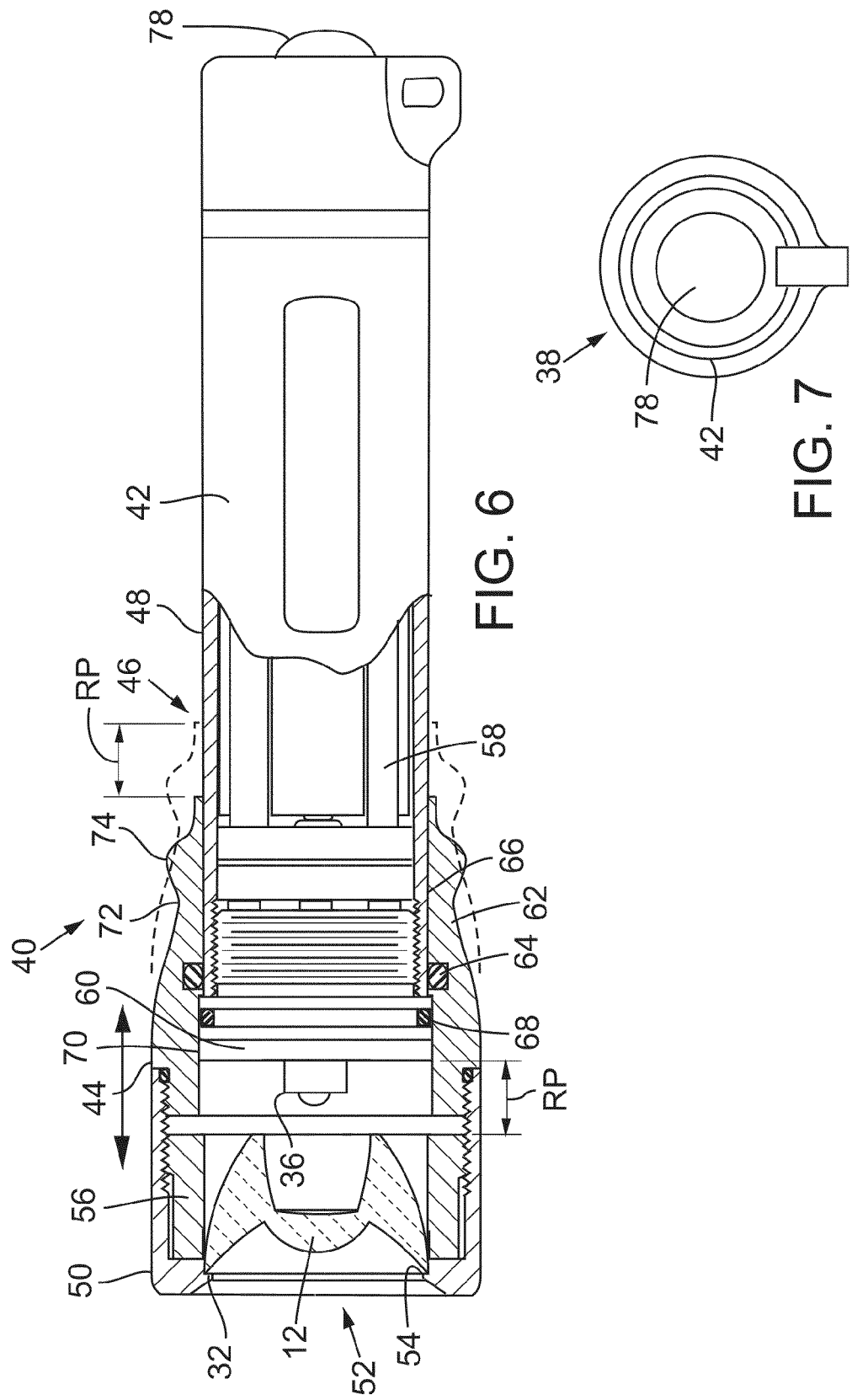

FOCUSING LENS SYSTEM

CROSS REFERENCE TO RELATED APPLICATIONS

The present application is a continuation-in-part of U.S. patent application Ser. No. 12/572,910, filed Oct. 2, 2009, titled "Focusing Lens System," the entire specification of which is hereby incorporated by reference in its entirety for all purposes, except those sections, if any, that are inconsistent with this specification.

TECHNICAL FIELD

The present invention relates to a lens for producing a beam of light from a light source, such as a light emitting diode (LED), in a flashlight or other lighting unit. The lens may be combined with an adjustment mechanism for varying the focus of the beam of light and may be housed in a structure supporting the lens, light source, and adjustment mechanism. Such structure may also include a power source, controls, interconnections, and electronics.

BACKGROUND

Lenses for flashlights and other lighting units have been provided in a variety of forms, generally having in common a shape that is symmetrical about an axis along which the light is directed, i.e., the optical axis. Several such lenses have included a hole in a rear end of the lens adjacent a light source. Within the hole, the light source may be adjusted in position along the optical axis. Adjustment of the light source's position relative to the rear hole of the lens enables variance of a light beam emerging from a front face of the lens. Typically, lenses are limited in their capacity to combine a maximum intensity for a spot beam with a substantial uniformity for a wide beam.

Prior art lenses were also typically provided with a central convex lens surface on a front face combined with at least one additional convex surface where the light was either received into the lens, reflected within the lens, or emitted from the lens. The additional convex surface in the prior art may have been deemed necessary for a proper focusing of light from the source into a beam. Prior art lenses were alternatively provided with light-receiving, reflecting, and emitting surfaces that were flat as viewed in cross-section. Such flat surfaces were also likely deemed necessary for light-focusing or manufacturing purposes.

SUMMARY OF THE INVENTION

The lens system described in the present application provides a lens that may be combined with a light source and an adjustment mechanism. The lens system may be incorporated in a flashlight or other lighting unit and provide for focusing the light from the source. A light emitting diode or LED is a suitable source although other light sources, such as incandescent or fluorescent bulbs may be used. The light beam may be adjustable between a spot beam and a wide beam.

The lens may include a lens body with a front face, a rear LED-receiving void or well, and a side surface extending between the front face and the rear well. The front face includes a central surface surrounded by an annular concave surface. The rear well includes a space for the LED to be adjusted in position defined by a concavely-curved void sidewall and a base. In various embodiments, the base may include a concave curvature, a substantially flat surface, or alternatively a convex focusing element surrounded by a substantially flat surface. The concave curvatures of the sidewall and base may be Bezier curves or basis function derived curves.

The lens system may include a housing structure built in two portions with an adjustment mechanism for moving one portion relative to the other. Typically the LED will be coupled to one portion of the housing and the lens coupled to the other.

The side surface of the lens body may define in cross-section an elliptical curve. The side surface is typically a light-reflecting surface, reflecting the light that strikes it from within the lens body. The side surface, viewed internally of the lens body as a reflector, typically defines in cross-section a concave curve. The side surface viewed from outside the lens body typically defines a convex curve.

The central surface of the lens body is typically convex and so includes a forward-most point, typically at the center of the surface. The annular surface of the front face of the lens body may extend forward to a front rim that is farther forward than the forward-most point of the central surface. The lens body may further include an outer, front rim defining a chamfer between the annular surface and the side surface.

The concave curves of the void sidewall and, in some embodiments, the base may be Bezier curves, or use other curves, for example basis function derived curves. A rim may run around the rear well and the rear well adjacent the rear rim may be provided with a draft angle to facilitate removal from a mold.

A flashlight incorporating the lens system may include the housing structure in two portions, the adjustment mechanism, the LED and the lens. The body of the lens may include the side surface, the rear well, with the base and the void sidewall, and the front face with the central and annular surfaces. Generally, in this lens body, the base and the void sidewall are light-admitting surfaces, and the central surface and the annular surface of the front face are light-emitting surfaces, while the side surface is a light-reflecting surface. All of these surfaces may be concave, except typically the central surface is convex, although the base may also include other configurations described in more detail herein.

A lighting unit may include a power supply, such as batteries or an AC-DC converter with electronics to condition a voltage waveform compatible with the LED. For example, a pulse width modulator may be used to adjust the effective brightness of the LED.

The lens body is typically formed of solid, transparent material such as polymethyl methacrylate (PMMA), molded or otherwise formed as a single piece for total internal reflection (TIR).

BRIEF DESCRIPTION OF THE DRAWINGS

FIG. 3 is a cross-sectional view of a lens body for the lens system according to an embodiment of the present description.

FIG. 4 is a cross-sectional view of a lens body for the lens system according to an embodiment of the present description.

FIG. 5 is a perspective view of the lens body of FIG. 4 in accordance with an embodiment of the present disclosure.

FIG. 6 is a partial cross-sectional view of the assembled lens system showing the movement of the head portion relative to the body portion.

FIG. 7 is an end view of the lens system, showing a control switch and lanyard connection structure.

8A-8D show the light refraction and reflection to form varying beams (8A wide beam to 8D spot beam) as the light source is moved in the rear well of the lens body.

Figure 9:
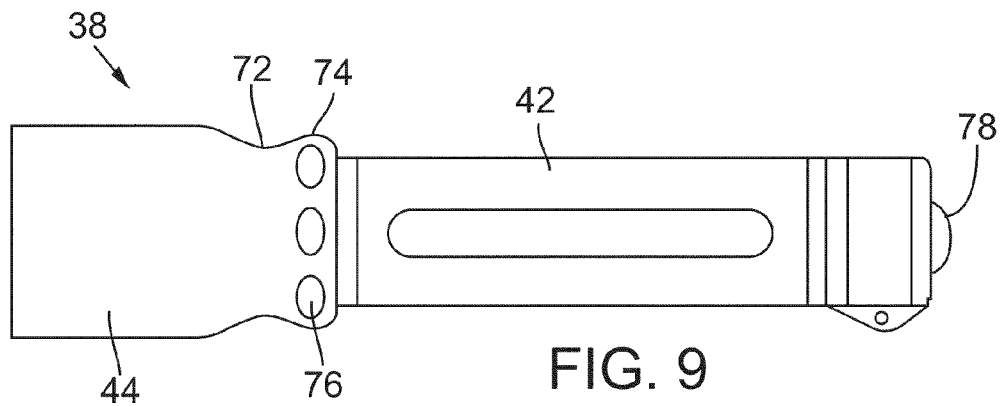

FIG. 9 is an external view of an embodiment of the lens system, with an outer profile for the head portion providing indentations on a finger-grip portion.

Figure 10:
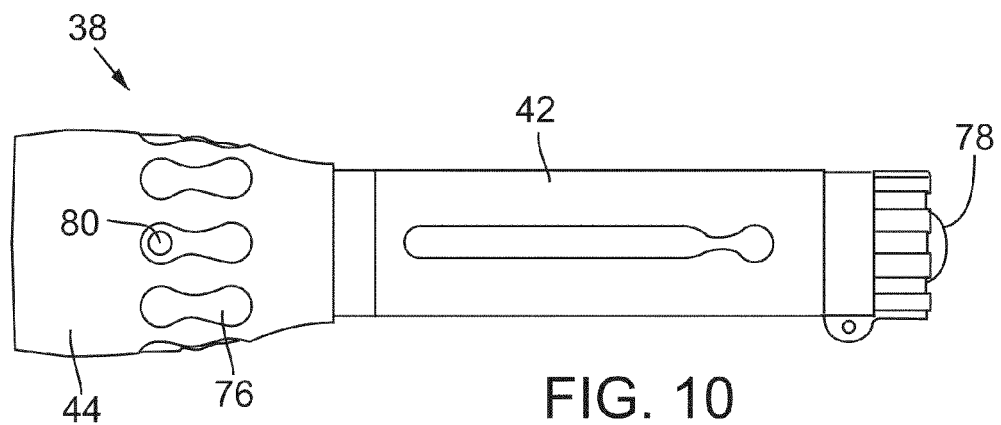

FIG. 10 is an external view of an embodiment of the lens system, with an outer profile for the head portion providing indentations and a button on a finger-grip portion.

Figure 11:
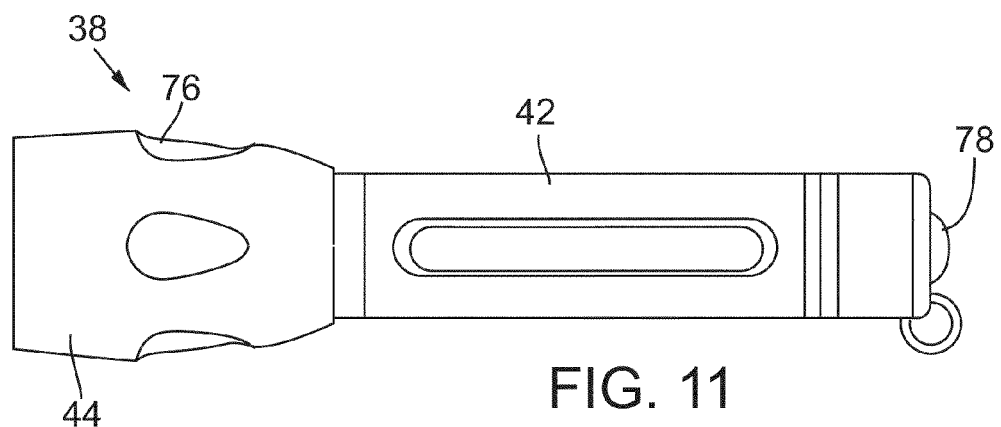

FIG. 11 is an external view of an embodiment of the lens system, with an outer profile for the head portion providing indentations on a finger-grip portion.

Figure 12:
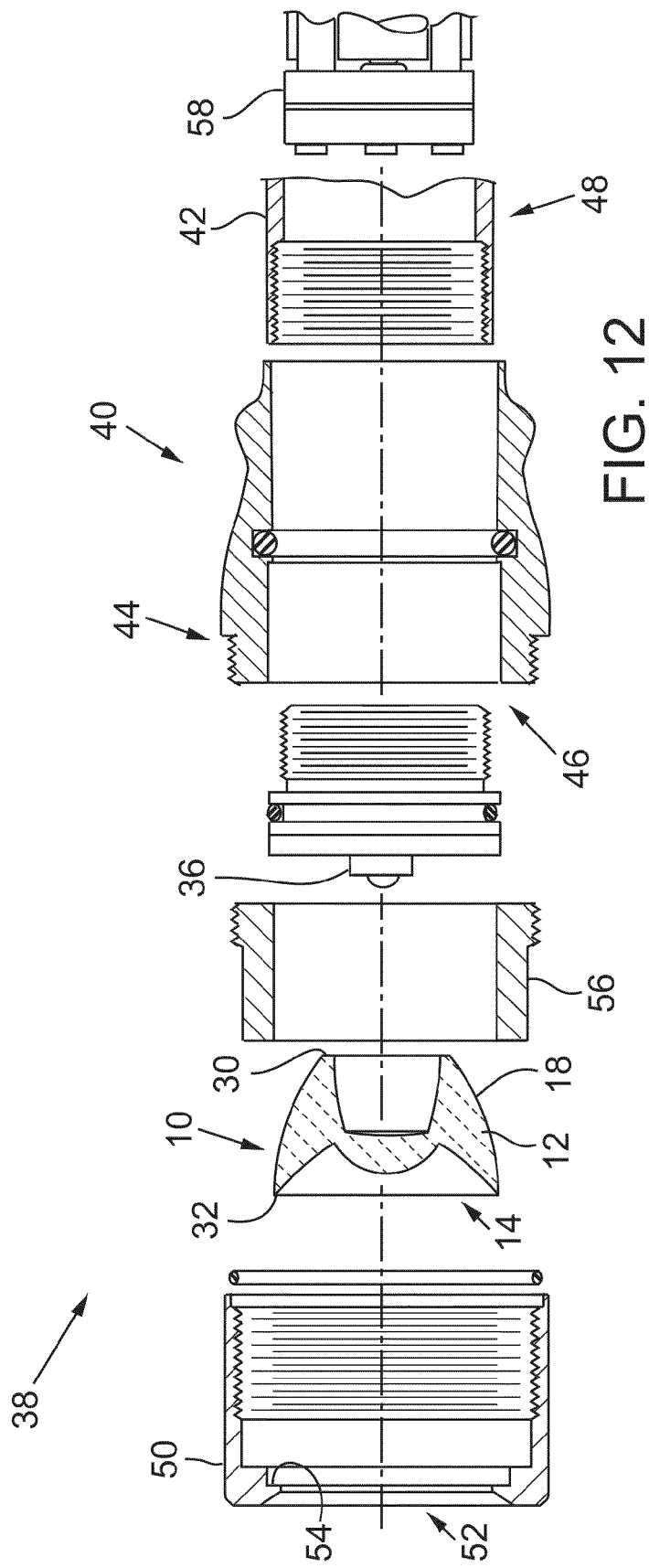

FIG. 12 is an exploded cross-sectional view of the lens system in accordance with various embodiments of the present disclosure.

DETAILED DESCRIPTION OF THE PREFERRED EMBODIMENTS

Figure 1:
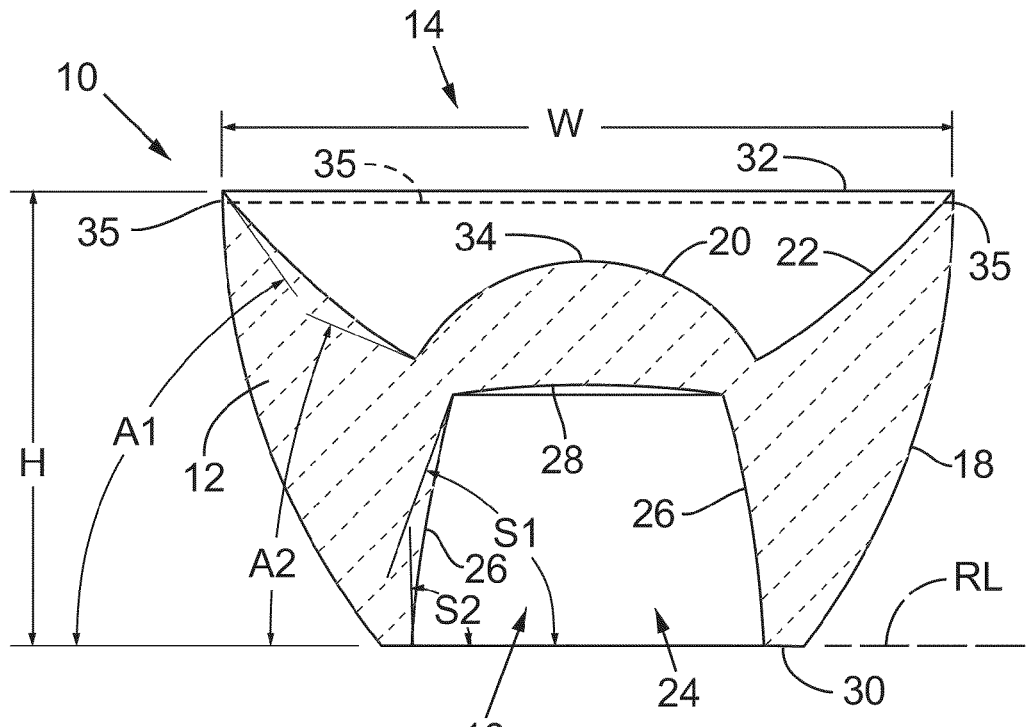
FIG. 1 is a cross-sectional view of lens body for the lens system according to an embodiment of the present description.

FIG. 1 shows a lens 10 for focusing light. Lens 10 may include a lens body 12 with a front face 14, a rear void, such as well 16, and a side surface 18 that extends between front face 14 and rear well 16. Front face 14 includes a central surface 20 surrounded by an annular surface 22 that may define in cross-section a concave curve. Rear well 16 defines a space 24 within which an LED or other light source may be adjusted in position (see e.g., FIG. 2).

Well 16 is typically defined by a void sidewall 26 and a base 28. Sidewall 26 preferably defines in cross-section, as shown in FIG. 1, a concave curve. Base 28, in this embodiment, also defines in cross-section a concave curve. Rear well 16 may include a rear rim 30, which as shown in FIG. 1, may be understood to define a reference line RL.

The shape of the concave curves in the base and sidewall may be any shape suitable for manufacture and use. The curve of sidewall 26 is typically a Bezier curve. A preferred Bezier curve for the sidewall of the rear well may include a first angle S1 adjacent the base of the well of about 74° relative to reference line RL and a second angle S2 adjacent the rear rim of the well of about 90° relative to the reference line with the angle of the curve varying therebetween, in accordance with characteristics of a Bezier curve. In other embodiments, the shape of the curves in the base and sidewall may be basis function derived curves. The invention is not to be limited in this manner.

The curve of base 28 may be substantially arcuate. A typical radius for such arcuate curve is no less than about 38-mm.

The curve of annular surface 22 of front face 14 is typically a Bezier curve. A preferred Bezier curve for annular surface 22 may include a first angle A1 adjacent a front rim 32 of front face 14 of about 48° relative to reference line RL and a second angle A2 adjacent central surface 20 of front face 14 of about 20° relative to reference line RL.

Figure 8A:
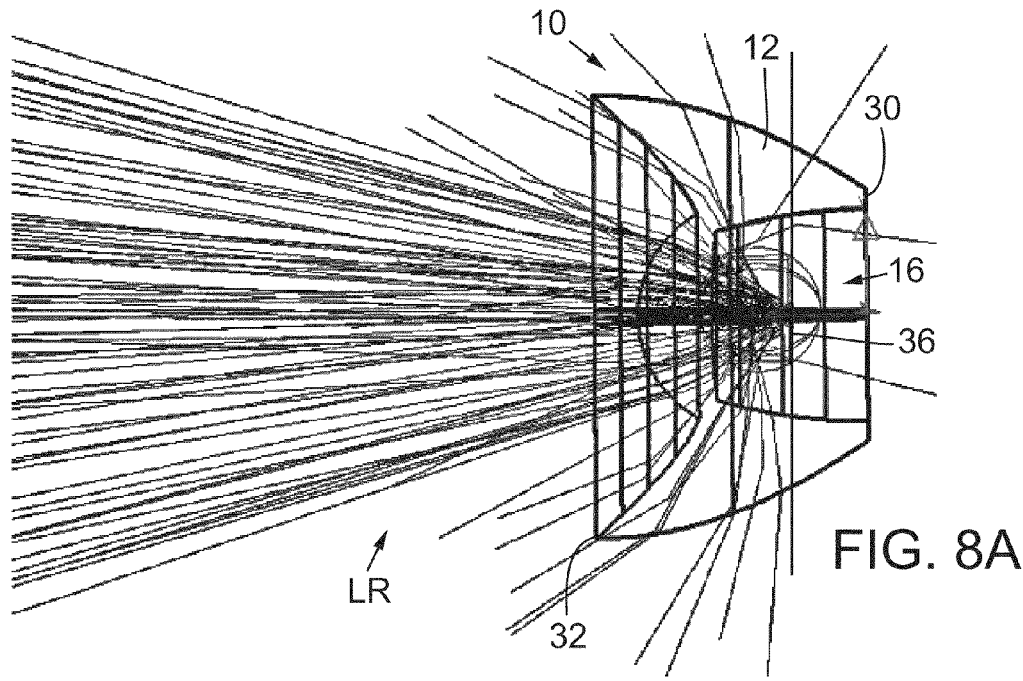
Figure 8B:
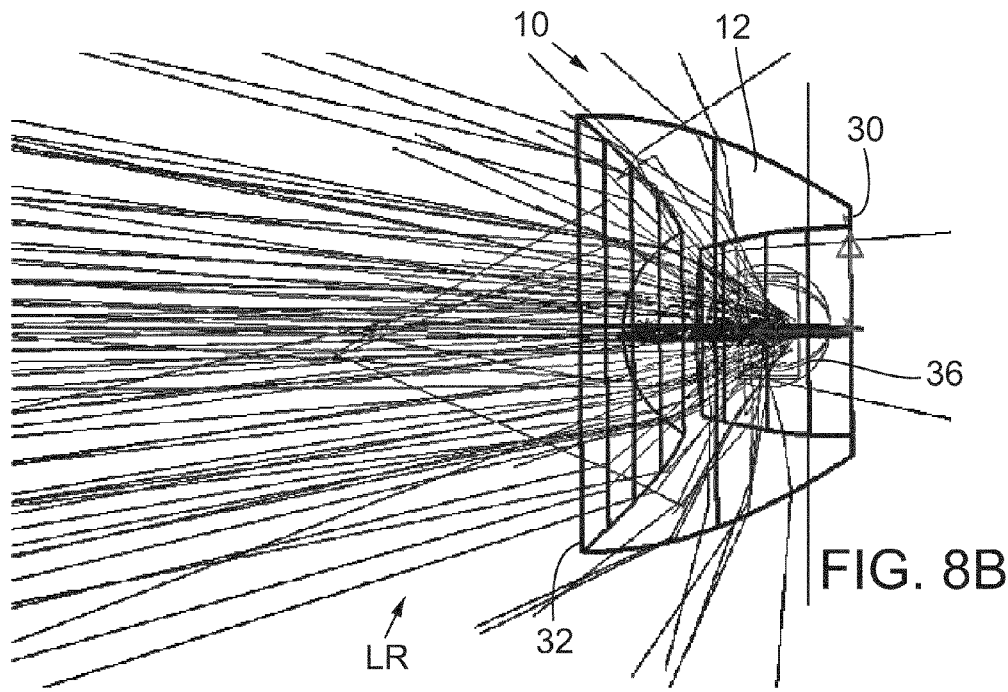
Figure 8C:
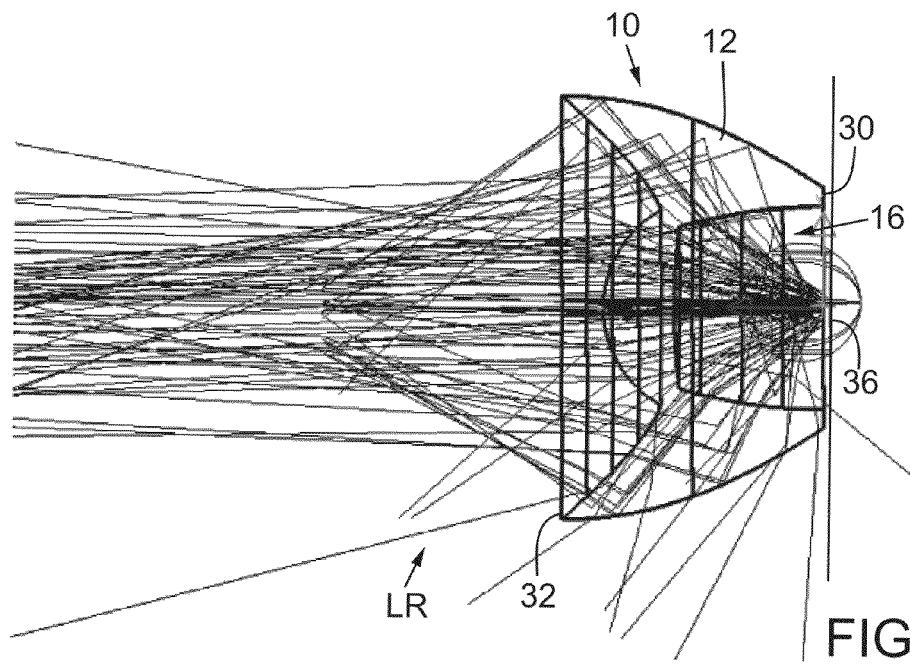

Side surface 18 of lens 10 typically defines in cross-section an elliptical curve, as shown in FIG. 1. Side surface 18 is ordinarily a light-reflecting surface. That is, it generally reflects light within lens body 12 (See, e.g., FIGS. 8C-8D). Side surface 18 may define in cross-section a curve that is concave with respect to the light that it reflects.

Central surface 20 is typically convex, defining a forward-most point 34. Central surface 20 may incorporate various curvatures and a typical curvature is substantially arcuate with a radius of no more than about 7-mm.

The measurements described with reference to the embodiments of the lens are merely exemplary. Those of ordinary skill in the art will readily understand that other measurements may be used without deviating from the scope of the disclosure. As an example, lens 10, in a large lens systems, be at least about twice as large as the measurements provided herein. Furthermore, the measurements discussed with reference to FIG. 1 may be equally applicable to the embodiments of FIGS. 2-5.

Annular surface 22 of front face 14 of lens body 12 may extend forward to front rim 32. Typically front rim 32 is farther forward than forward-most point 34 of central surface 20. Front or outer rim 32 may include a chamfer 35 between the annular surface and the side surface of at least about 1-mm of width. Chamfer 35 may have a width selected for a desired lens size and operational characteristics, and, as examples only, may be about 1.5-mm, about 1.6-mm, about 2.6-mm, or about 3.0-mm in width.

Lens 10 defines a width W that is the outer diameter at front rim 32 and a height H between rear rim 30 and front rim 32 or chamfer 35. Typically width W is between about 20-mm and about 50-mm, and, as examples only, may be about 20.7-mm, about 26.0-mm, about 39.0-mm, or about 46.6-mm.

Rear well 16 typically has an inner diameter at rear rim 30 of at least about 9-mm. Rear well 16 may have an inner diameter selected for a desired lens size and operational characteristics, and, as examples only, may be about 9.8-mm, about 12.6-mm, about 19.4-mm, or about 22.1-mm. Rear well 16 may be provided adjacent rear rim 30 with a draft angle of between about 2° and about 3° to ease removal of the mold parts from around the rear well.

Figure 2:
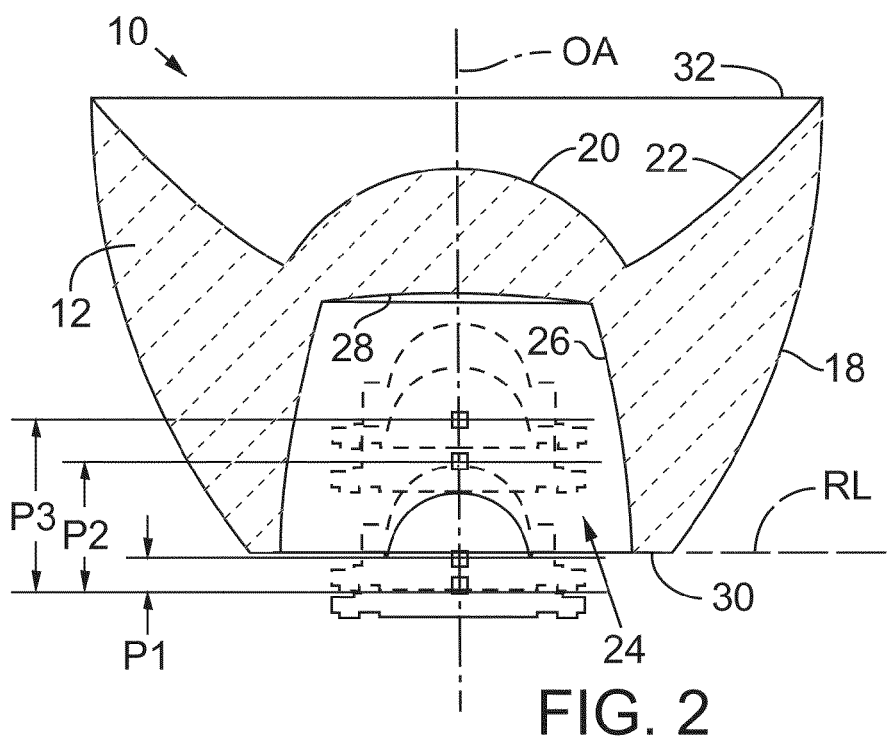
FIG. 2 is a cross-sectional view of the lens body of FIG. 1 incorporating a light source that is adjustable in position along an optical axis.

As seen in FIG. 2, a light source, such as LED 36, is preferably adjustable in position along an optical axis OA, generally within rear well 16, from a typical starting position, shown in solid line, through intermediate positions, P1 and P2, to a final position, P3. The adjustment may be continuous or it may be provided with stops or detents at selected positions. Any range of position adjustments may be incorporated as suited to the particular lens size, design, and desired beam variations. Typically the range is about 5-mm to about 6-mm, and other examples of range include about 6.1-mm, about 6.8-mm, about 14.0-mm, or about 16.9-mm. LED 36 may be located at or below reference line RL at its rearmost position, or may start within rear well 16 above reference line RL. Typically rear well 16 is about 9-mm deep and other examples of depth include about 12.8-mm, about 15.9-mm, about 23.2-mm, or about 28.6-mm. LED 36 may be movable forward within the well to within about 3-mm to 5-mm of base 28, or to other limits as selected for desired operational characteristics of the lens system. In general, the concave curvatures of sidewall 26 and base 28 allow for increased movement and larger structure of the LED and its supporting structure within rear well 16 as compared to convex curvatures.

A preferred embodiment of a lens, e.g., for a medium-sized lens system, combine a lens width of about 20.7-mm, a height of about 12.8-mm, an inner diameter of about 9.8-mm, a chamfer width of about 1.6-mm, and a range of position adjustment of about 6.1-mm. Other combinations may be selected for desired operational characteristics. Typically such dimensions may be varied by at least about ±10%.

With reference to FIG. 3, a lens body for a lens focusing system is illustrated in accordance with various embodiments. The lens 10 may include a lens body 12 having a front face 14 and a rear face 15. The front face 14 includes a convex central surface 20 surrounded by and disposed coaxially with an annular surface 22 that defines in cross-section a concave curve. The rear face 15 includes a light emitting diode receiving well, such as well 16, which is defined by a well base 28 and a well sidewall 26, the well sidewall 26 defining in cross-section a concave curve. Interconnecting the front face 14 to the rear face 15 is a side surface 18, which defines in cross-section an elliptical curve. Rear well 16 defines a space 24 within which an LED or other light source may be adjusted in position.

In the embodiment, well 16 may be defined by the void sidewall 26 and the base 28. The base 28, in one embodiment, defines, in cross-section, a flat surface. In other words, the base 28 may be defined by a plane that is parallel to a reference line defined by a rear rim 30. In various embodiments the flat surface may comprise a number of geometric shapes, for example, the base 28 may be defined by a circular flat surface or alternatively, a square flat surface. In various embodiments, the shape of the concave curve in the void sidewall 26 may be any shape suitable for manufacture and use. The curve of void sidewall 26 may be a Bezier curve and may be defined by angles, with respect to the reference line RL, as described with reference to FIG. 1.

In the embodiment of FIG. 3, the front face 14 includes an annular surface 22 that defines, in cross-section, a concave curve. The concave curve may be a Bezier curve and may also be defined by angles as described with reference to FIG. 1. The annular surface 22 defines a front rim 32 that may include a chamfer. The front face 14 also includes a convex central surface 20. The convex central surface 20 includes a forward-most point 34. The forward-most point 34, in various embodiments, is disposed within an area 35 defined by a front rim 32 of the annular surface 22.

Referring to FIG. 4, a lens body for a lens focusing system is illustrated in accordance with another embodiment. The lens 10 may include a lens body 12 having a front face 14 and a rear face 15. The front face 14 may include similar features to those described with reference to FIGS. 1-3. The rear face 15 includes a light emitting diode receiving well, such as well 16, which is defined by well base 28 and well sidewall 26, the well sidewall 26 defining in cross-section a concave curve. Interconnecting the front face 14 and the rear face 15 is a side surface 18, which defines in cross-section an elliptical curve.

In various embodiments, the well base 28 may include a convex focusing element 31. The convex focusing element 31 may have an overall diameter that is less than a diameter of the well base 28. Consequently, the convex focusing element 31 may be described as a spherical bump that is disposed coaxially with the well base 28. Because the convex focusing element 31 has a diameter that is less than a diameter of the well base 28, the overall well base 28 may be separated into two portions, a first portion 37 and a second portion 33. The second portion 33 may be the convex focusing element 31. The second portion 33 may have a height defined from the base 28, and be disposed coaxially with the well base 28. The first portion 37 may be substantially flat and consist of the area of the well base that is disposed between the convex focusing element 31 and the void sidewall 26.

In various embodiments, the focusing element 31 may interact with a light source in various manners dependent up, for example, the position of the light source. When the light source is far away from the lens (a narrow angle position), only a small fraction of the light may interact with the focusing element 31. Consequently, the focusing element 31 does not noticeably influence narrow light distribution. When the light source is near to the focusing element 31 (a wide angle position), the focusing element 31 influences the beam pattern in the desired manner. Thus, the focusing element 31 enables wide angle light distribution, with little effect on narrow angle distribution.

With reference to FIG. 5, a perspective view of a lens body as described with reference to FIG. 4 is illustrated. The lens body 10 includes the rear face 15 which includes the well sidewall 26, and the base 28 including the convex focusing element 31. As illustrated, the well base 28 may be circular in orientation and have a first portion 37 and a second portion 33. The first portion 35, or alternatively, the area between the convex focusing element 31 and the well sidewall 26 may be substantially flat. The second portion 35 may comprise the convex focusing element 31 which protrudes into the LED receiving well 16. As illustrated, the convex focusing element 31 may be disposed coaxially with the base 28.

Figure 8D:
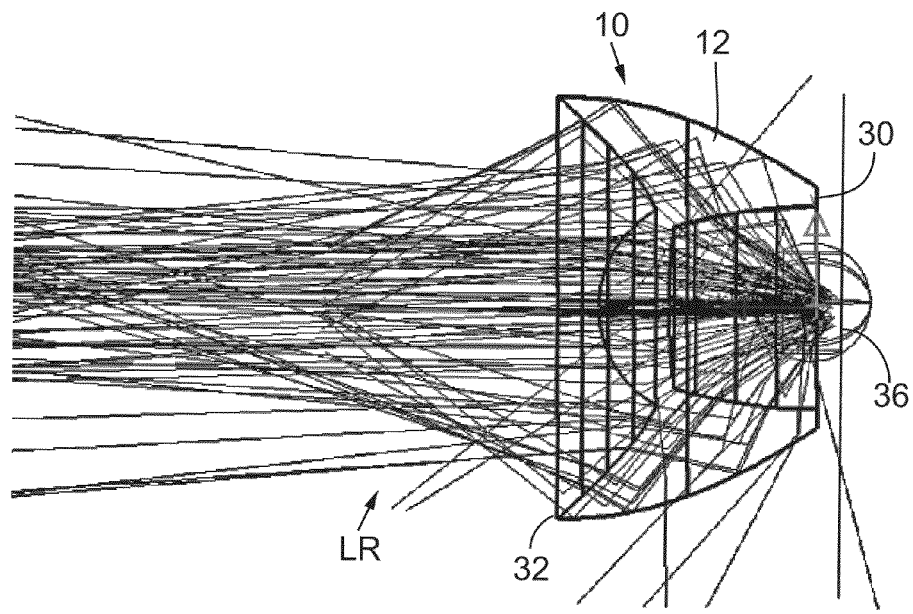

As best seen in FIGS. 8A-D, adjustment of the LED position relative to the lens provides a beam ranging between a wide beam (FIG. 8A) and a narrow or spot beam (FIG. 8D). A spot beam may provide about +/−0.3° of angular distribution at about 50% of maximum intensity. An example of a wide beam is a distribution with an angular range of about +/−20° over which the intensity is at least about 50% of the maximum or on-axis value. With the design of the present embodiment, the light may be varied from spot beam to wide beam with the adjustment in position of the LED being no more than about 5-mm. A representation of the light rays LR calculated for a typical lens and LED configuration is shown in each of FIGS. 8A-8D. As can be seen, lens 10 typically directs a substantial portion of light rays LR into the desired beam and a smaller portion of light rays LR may be expected to travel outside the desired beam.

A lens system 38, as shown in FIGS. 6-7 and 9-12, for focusing a light beam may include a housing structure 40 including a first portion, such as body 42, a second portion, such as head 44, and an adjustment mechanism 46 for moving the first portion relative to the second portion. Adjustment mechanism 46 is preferably a slidable mounting of head 44 onto body 42, or alternatively may be a threaded engagement between portions 42 and 44 or other suitable mechanism allowing a user to adjust the relative positions of the housing portions.

LED 36 may be coupled to body 42 of housing 40. Lens 10 may be coupled to head 44 of housing 40. In various embodiments, the lens 10 may be a lens as described in any of FIGS. 1-5. A slidable mounting between the portions allows direct movement of head 44, while a threaded engagement between the portions allows rotating one portion relative to the other, in either case allowing a relative movement or adjustment in position RP (FIG. 6) of LED 36 and lens 10 to adjust the light beam between a spot beam and a wide beam.

LED 36 and lens 10 may combine to produce a diode image visible in the light beam. The present embodiment is believed to substantially reduce such diode image if the range of movement RP in adjusting the relative position of lens 10 and LED 36 is limited to no more than about 5-mm.

Lens system 38 of the present embodiment, with the adjustment mechanism as described may provide the light beam with a wide beam having a distribution with an angular range of about +/−20° over which the intensity is at least 50% of the maximum or on-axis value. For that wide beam, lens system 38 is believed to provide a substantially uniform intensity between at least about +/−10° of angular distribution. Lens system 40 is also believed to provide an increased intensity for the spot beam as compared to a similar lens incorporating one or more flat or convex surfaces among its rear well sidewall, rear well base, front annular surface, and/or side surface.

A flashlight 48 according to the present embodiment may include, as seen in FIGS. 6 and 12, the housing structure with the adjustment mechanism, LED, and lens as described above. Head 44 may include a cap 50 with an opening 52 defined by a lip 54 adjacent front rim 32 of lens 10. A bracket, such as internal nut 56 may be threadably engaged in cap 50 to hold lens 10 in place by pressing front rim 32 and/or chamfer 35 against lip 54. Typically, lip 54 overlaps front rim 32 and/or chamfer 35 by between about 0.5-mm and about 1.0-mm, or such overlap as selected for particular lens dimensions and desired application of the flashlight. Flashlight 48 may include a clear protective plate in front of lens 10 or the lens may provide the external surface. Typically electronics, batteries, and interconnections 58 are provided in body portion 42 of housing structure 40.

Body 42 may include a threaded engagement for receiving a mount 60 for LED 36. Head 44 may include a base portion 62 with a threaded engagement for attaching to cap 50. O-rings may be provided as desired to seal the threaded connections. Adjustment mechanism 46 may include an internal O-ring 64 mounted in head 44 that bears on an external surface 66 of body 42 as the position of the head is adjusted. Mount 60 of LED 36 may be provided with an O-ring 68 on which an internal surface 70 of head 44 bears as the position of the head is adjusted.

Head 44 is preferably provided with a grip-enhanced region, such as groove 72 and swell 74, typically extending around base portion 62. The grip-enhanced region aids a user, e.g., in a one-handed adjustment of the focus of the beam by providing a convenient grip for the thumb and forefinger on the head while the body is gripped by the other three fingers. Various other grip-enhanced regions may be provided, such as one or more indentations 76, as shown in FIGS. 9-11, on swell 74 or elsewhere on head 44. As shown in FIGS. 6 and 9-12, a control button 78 may be provided on flashlight body 42, e.g., at an end opposite the head. A button 80 (FIG. 10) may also be provided on head 44 for any purpose, such as control of adjustment of head position or other gripping or control purposes.

Housing structures may be made from a metal such as aluminum or steel or a plastic such as ABS. Component materials may be selected to be compatible with lighting unit operation in harsh environments such as very high or very low ambient temperatures.

Although the invention has been described in detail for the purpose of illustration, it is to be understood that such detail is solely for that purpose, and variations can be made therein by those skilled in the art without departing from the spirit and scope of the invention, except as it may be limited by the claims.

Applicants regard the subject matter of their invention to include all novel and non-obvious combinations and sub-combinations of the various elements, features, functions and/or properties disclosed herein. No single feature, function, element or property of the disclosed examples is essential to all examples. The following claims define certain combinations and sub-combinations which are regarded as novel and non-obvious. Other combinations and sub-combinations of features, functions, elements and/or properties may be claimed through amendment of the present claims or presentation of new claims in this or a related application. Such claims, whether they are different, broader, narrower or equal in scope to the original claims, are also regarded as included within the subject matter of applicants' invention.

We claim:

1. A lens system, comprising:
    a housing including a first portion and a second portion, wherein the first portion is configured to move relative to the second portion;
    a lens coupled to the second portion, wherein the lens includes an annular surface and a void sidewall that define, in cross-section, concave curves; and
    a light source coupled to the first portion, wherein the light source is configured to interact with the lens to provide a light beam.

2. The lens system of claim 1, wherein the lens further includes a void base, the void sidewall and the void base defining a void configured to receive the light source.

3. The lens system of claim 2, wherein the void base defines, in cross-section, a flat surface.

4. The lens system of claim 2, wherein the void base includes a convex focusing element that has a diameter less than a diameter of the void base.

5. The lens system of claim 4, wherein the convex focusing element is disposed coaxially with the light source.

6. The lens system of claim 1 wherein the annular surface is disposed on a front facing portion of the lens, and the front facing portion of the lens further includes a convex central surface.

7. The lens system of claim 1, wherein the housing further includes an adjustment element configured to move the first portion relative to the second portion.

8. The lens system of claim 1, wherein the light source is a light emitting diode (LED), and wherein the LED and the lens are configured to produce a diode image.

9. The lens system of claim 1, wherein the lens defines an optical axis and the first portion is configured to move about 5 millimeters along the optical axis relative to the second portion.

10. The lens system of claim 1, wherein the concave curve of the void sidewall is substantially arcuate with a radius of about 38 millimeters.

11. A lens, comprising:
    a front face having a convex central surface disposed coaxially with an annular surface, wherein the annular surface defines, in cross-section, a concave curve; and
    a rear face having a light emitting diode (LED) receiving well, wherein the LED receiving well is defined by a well base and a well sidewall, and wherein the well sidewall defines, in cross-section, a concave curve.

12. The lens of claim 11, wherein the well base defines, in cross-section, a flat surface.

13. The lens of claim 11, wherein the well base includes a convex focusing element, wherein the convex focusing element has a diameter that is less than a diameter of the well base.

14. The lens of claim 13, wherein the convex focusing element is disposed coaxially with the well base.

15. The lens of claim 13, wherein an area of the well base between the sidewall and convex focusing element is substantially flat.

16. The lens of claim 11, further comprising a side surface interconnecting the front face and the rear face, wherein the side surface defines, in cross-section, an elliptical curve.

17. The lens of claim 11, wherein the annular surface forms a front rim that extends farther than the convex central surface.

18. The lens of claim 11, wherein the concave curve of the annular surface is a Bezier curve.

19. The lens of claim 11, wherein the concave curve of the well sidewall is a Bezier curve.

20. The lens of claim 18, wherein the LED receiving well includes a rim defining a reference line, and further wherein the Bezier curve of the well sidewall defines a first angle adjacent the base of the LED receiving well of about 74° relative to the reference line and a second angle adjacent the rim of about 90° relative to the reference line.

* * * * *